United States Patent
Morano et al.

(10) Patent No.: US 10,385,936 B2
(45) Date of Patent: Aug. 20, 2019

(54) MECHANICALLY-KEYED NON-SLIP BRAKE JOINTS

(71) Applicant: Ford Global Technologies, LLC, Dearborn, MI (US)

(72) Inventors: Christopher Michael Morano, Canton, MI (US); Anthony Vasquez, Garden City, MI (US); Werner Gottschalk, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 15/654,380

(22) Filed: Jul. 19, 2017

(65) Prior Publication Data

US 2019/0024734 A1  Jan. 24, 2019

(51) Int. Cl.
| | |
|---|---|
| F16D 65/02 | (2006.01) |
| F16D 65/095 | (2006.01) |
| F16D 55/22 | (2006.01) |
| F16D 65/00 | (2006.01) |
| F16D 55/00 | (2006.01) |
| F16D 55/226 | (2006.01) |

(52) U.S. Cl.
CPC ........... F16D 65/095 (2013.01); F16D 55/22 (2013.01); F16D 65/0056 (2013.01); *F16D 55/226* (2013.01); *F16D 2055/0008* (2013.01)

(58) Field of Classification Search
CPC .. F16D 65/0056; F16D 65/0068; F16D 65/02; F16D 55/227
USPC ........ 188/73.31, 73.39, 73.46; 403/345, 350, 403/359.6, 363, 367, 374.1, 409.1
See application file for complete search history.

(56) References Cited

U.S. PATENT DOCUMENTS

| | | | |
|---|---|---|---|
| 6,217,251 B1 * | 4/2001 | Kato | F16B 17/004 403/341 |
| 7,356,901 B1 | 4/2008 | Sherman, II | |
| 8,118,142 B2 * | 2/2012 | Redemann | F16D 55/02 188/73.39 |
| 9,353,810 B2 | 5/2016 | Morais et al. | |
| 9,506,512 B2 * | 11/2016 | Plantan | F16D 65/02 |
| 9,551,387 B2 | 1/2017 | Smith et al. | |
| 2005/0150729 A1 * | 7/2005 | Baumgartner | F16D 55/22 188/72.9 |
| 2007/0137953 A1 * | 6/2007 | Paul | F16D 55/228 188/73.46 |
| 2016/0131207 A1 | 5/2016 | Morais et al. | |

FOREIGN PATENT DOCUMENTS

| | | |
|---|---|---|
| EP | 1012017 | 6/2005 |
| EP | 1801447 | 6/2007 |

* cited by examiner

*Primary Examiner* — Christopher P Schwartz
(74) *Attorney, Agent, or Firm* — Ray Coppiellie; Hanley, Flight & Zimmermman, LLC (57) ABSTRACT

Methods, apparatus, and articles of manufacture are disclosed for mechanically-keyed non-slip brake joints. An example apparatus includes an anchor bracket having a first contact surface with a first fastener opening formed therethrough. A protrusion extends from the first contact surface. The apparatus also includes a mount having a second contact surface with a second fastener opening therethrough. A cavity is formed in the second contact surface. The anchor bracket is to be coupled to the mount such that protrusion matably engages the cavity.

20 Claims, 10 Drawing Sheets

MECHANICALLY-KEYED NON-SLIP BRAKE JOINTS

FIELD OF THE DISCLOSURE

This disclosure relates generally to brake joints and, more particularly, to mechanically-keyed non-slip brake joints.

BACKGROUND

Vehicle disc brakes include a rotor and a caliper. The caliper moves one or more brake pads into engagement with the rotor, which slows the rotor and, thus, slows the vehicle. The caliper is mounted to a stationary structure near the rotor via a brake joint, which prevents the caliper from rotating with the rotor. The reaction force applied by the rotor on the caliper is transferred from the caliper through the brake joint to the stationary structure. In recent years, electronic vehicle brake systems have been developed to assist in the braking and control of the vehicle (e.g., antilock brake systems, electronic stability control, etc.). These electronic vehicle brake systems provide quicker and more powerful brake applications, which increase the amount of force experienced by the brake joint.

SUMMARY

An example apparatus disclosed herein includes a brake caliper anchor bracket having a first contact surface with a first fastener opening therethrough. A protrusion extends from the first contact surface. The example apparatus also includes a mount having a second contact surface with a second fastener opening therethrough. A cavity is formed in the second contact surface. The anchor bracket is to be coupled to the mount such that the protrusion matably engages the cavity.

An example brake anchor bracket disclosed herein includes a body having a contact surface to be coupled to a mount on a vehicle. An opening is formed in the contact surface to receive a fastener. The example brake anchor bracket also includes a protrusion extending from the contact surface at or near the opening. The protrusion is formed by at least one side surface extending from the contact surface and a top surface substantially parallel to the contact surface.

An example brake joint disclosed herein includes an anchor bracket having a first contact surface with a first fastener opening therethrough. The anchor bracket has a first keying feature. The example brake joint also includes a mount having a second contact surface with a second fastener opening therethrough. The mount has a second keying feature. The second keying feature is to matably engage with the first keying feature when the mount and the anchor bracket are coupled.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Vehicle disc brakes include a rotor (sometimes referred to as a disc) and a caliper. The rotor is attached to an axle of the vehicle and rotates with a wheel of the vehicle. The caliper is mounted, via an anchor bracket, to a stationary mounting structure, that does not rotate with the rotor, near the rotor. For example, the anchor bracket may be coupled to a steering knuckle on a front axle of the vehicle.

In known vehicles, the brake joint formed between the mounting structure (e.g., a steering knuckle) and the anchor bracket is known as a slip joint. The anchor bracket has a flat contact surface that is coupled to a parallel flat contact surface of the mounting structure. One or more bolts extend through openings in the contact surfaces to clamp the anchor bracket and the mounting structure together. Although the structures may be clamped relatively tight, some movement (e.g., slippage) may still occur. For example, when engaging the brake, the caliper is pulled (e.g., via friction) in the direction of the rotation of the rotor. When the brake is released, the caliper may settle back to its original position. This dynamic loading causes slippage between the contact surfaces of the anchor bracket and the mounting structure. Such slippage can lead to increased wear that may impair the functionality of the brake. Further, this slippage can lead to fastener movement, torque fall-off, and clamp force fall-off, especially when pressure to the caliper is applied and released.

Further, modern vehicles often utilize electronic control units to assist in the operation of disc brakes (e.g., beyond the capability of a normal driver). Electronic control units include antilock brake functionality and electronic stability control functionality among other electronic functions. For instance, the antilock brake system of a vehicle may actuate the brake at a substantially high rate at a substantially high force. This puts considerable dynamic loads on the brake joint that cause the joint to slip or flex without sufficient time to recover and stabilize. Further, such dynamic loads increase or amplify the negative effects of slippage described above.

Disclosed herein are mechanically-keyed non-slip brake joints that eliminate or substantially reduce slippage between an anchor bracket and a mounting structure and, thus, reduce the above drawbacks. An example non-slip brake joint disclosed herein is formed by a first keying feature on an anchor bracket and a second keying feature on a mounting structure that matably engage to form a mechanically-keyed or locked joint. The first keying feature includes a first geometry, such as a protrusion extending from a contact surface of the anchor bracket, and the second keying feature includes a second matching geometry, such as a matching cavity formed in a contact surface of the mounting structure. In other examples, the locations of the protrusion and cavity may be reversed. When the anchor bracket and the mounting structure are coupled, the protrusion extends into the cavity. In some examples, the protrusion and the cavity are dimensioned to form a transition fit, such as a tight fit, when the anchor bracket and the mounting structure are coupled. In other examples, the protrusion and the cavity may be dimensioned to form other fits, such as a clearance fit or an interference fit. As such, the stresses and loads from cyclical brake loading are transferred through the first and second keying features between the anchor bracket and the mounting structure instead of through the fastener connection as seen in known slip joints. Further, by using the first and second keying features, the example joints eliminate or substantially reduce movement (e.g., slippage) between the flat parallel contact surfaces of the anchor bracket and the mounting structure, thereby decreasing or eliminating the wear associated with such movement. Also, in some examples, the first and second keying features are dimensioned such that the fastener openings on the anchor bracket and the mounting structure are aligned when the first and second keying features are coupled, which reduces the risk of cross-threading when the fastener (e.g., bolt) is coupled to the openings.

The first keying feature and the second keying feature may have a variety of different shapes or geometries. For example, the first keying feature of the anchor bracket may be a protrusion having an annular sector shape formed at or near the fastener opening (e.g., a bolt hole) in the contact surface of the anchor bracket. Additionally, the second keying feature of the mounting structure may be a cavity having a complementary annular sector shape formed in the contact surface of the mounting structure (e.g., a steering knuckle) at or near the corresponding fastener opening. When the anchor bracket is coupled to the mounting structure, the raised annular sector protrusion extends into the cavity to form a mechanically locked interface between the anchor bracket and the mounting structure. In some examples, the annular sector shape of both the anchor bracket and the mounting structure is partially formed by the fastener opening on both the anchor bracket and the mounting structure and are aligned when the first and second keying features are coupled. In other examples, the first and second keying features may be other complementary shapes such as a raised rectangular protrusion and a matching rectangular cavity.

Figure 1:
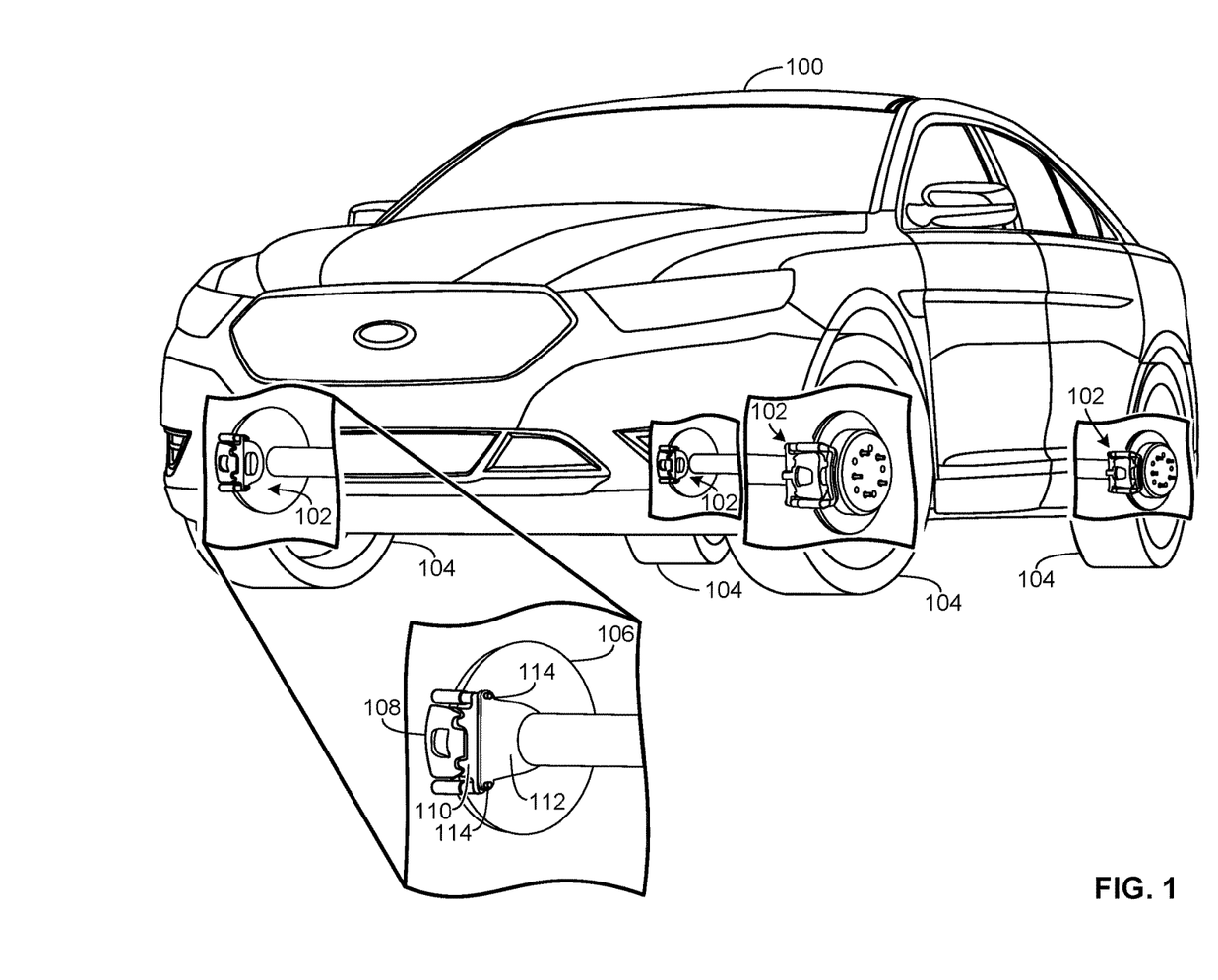
FIG. 1 illustrates an example vehicle in which the examples disclosed herein may be implemented.

FIG. 1 illustrates an example vehicle 100 in which the example mechanically-keyed non-slip brake joints disclosed herein may be implemented. In the illustrated example, the vehicle 100 is depicted as a car. However, in other examples, the vehicle 100 may be a truck, a van, a motorcycle, and/or any other type of vehicle that may employ a disc brake. In the illustrated example, the vehicle 100 includes four disc brakes 102, one for each wheel 104. One of the disc brakes 102 is depicted in a callout in FIG. 1. The disc brake 102 includes a rotor 106 and a caliper 108. The caliper 108 is disposed around a portion of the rotor 106 and operates to slow the rotor 106 by urging one or more brake pads onto the sides of the rotor 106. The caliper 108 is supported by an anchor bracket 110 that is coupled to a mounting structure 112, referred to herein as the mount 112. In the illustrated example, the mount 112 is a steering knuckle. However, in other examples, the mount 112 may be another structure. For example, on one of the brakes 102 on one of the rear wheels 104, the corresponding anchor bracket may be coupled to a bearing flange. The anchor bracket 110 may be coupled to the mount 112 via one or more fasteners. For example, in the callout depicted in FIG. 1, the anchor bracket 110 and the mount 112 are coupled via two bolts 114. In other examples, other types of and/or numbers of fasteners may be used. The anchor bracket 110 and the mount 112 in the callout are coupled to form an example mechanically-keyed non-slip brake joint as disclosed in further detail herein. In some examples, only one of the brakes 102 is implemented with an example mechanically-keyed non-slip joint. In other examples, more than one (e.g., all) of the brakes 102 may be implemented with example mechanically-keyed non-slip brake joints.

Figure 2:
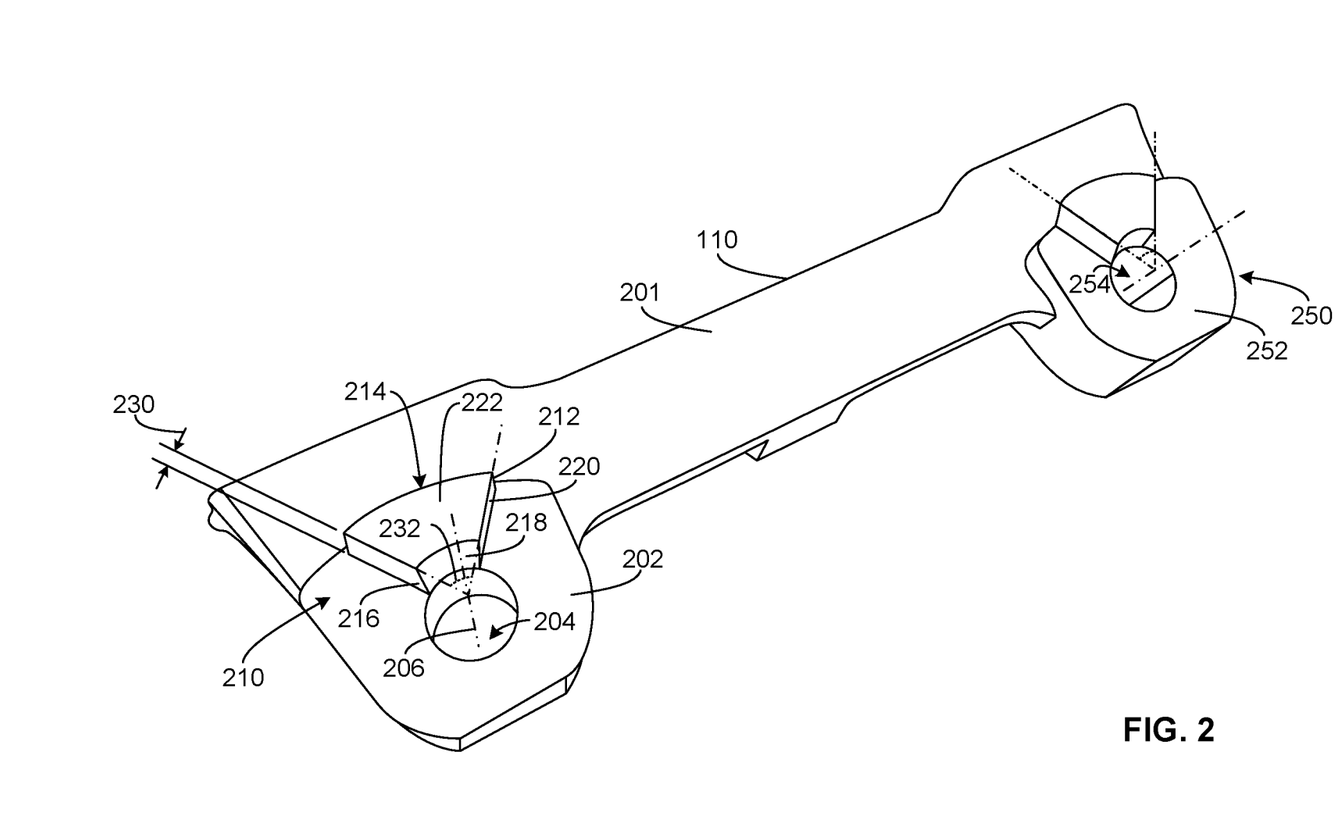
FIG. 2 illustrates an example anchor bracket having a first example keying feature.

FIG. 2 illustrates a portion of the example anchor bracket 110 of FIG. 1. In the illustrated example, the anchor bracket 110 includes a body 201 having a first contact surface 202 and a first fastener opening 204 formed in the first contact surface 202. The first fastener opening 204 is to receive a fastener, such as the bolt 114 (FIG. 1), to couple the anchor bracket 110 to the mount 112 (FIG. 1). A first axis 206 of the first fastener opening 204 extends parallel to a rotational axis of the rotor 106 (FIG. 1). In the illustrated example, the anchor bracket 110 includes a first keying feature 210 near the first fastener opening 204. In this example, the first keying feature 210 is implemented as a protrusion 212 extending from the first contact surface 202. The protrusion 212 has an annular sector shape (e.g., a wedge shape) when viewed in planform.

The example protrusion 212 is formed by one or more side surfaces (e.g., side walls) extending outwardly from the first contact surface 202 and a top surface that is substantially parallel (e.g., ±2°) to the first contact surface 202. In the example of FIG. 2, the protrusion 212 is formed by a first side surface 214, a second side surface 216, a third side surface 218, and a fourth side surface 220 extending outwardly (e.g., perpendicularly) from the first contact surface 202 and a top surface 222 extending between the first, second, third, and fourth side surfaces 214, 216, 218, 220. In the illustrated example, the top surface 222 and the first contact surface 202 are substantially parallel and a height 230 of each of the first, second, third, and fourth sides surfaces 214, 216, 218, 220 is substantially the same. However, in other examples, the heights 230 of the first, second, third, and/or fourth side surfaces 214, 216, 218, 220 may be different and the top surface 222 may be angled with respect to the first contact surface 202.

In the illustrated example, the annular sector shape of the protrusion 212 is defined by an angle 232. In the illustrated example, the example angle 232 is an acute angle (e.g., less than 90 degrees). However, in other examples, the angle 232 can be other angles, such as a right angle, an obtuse angle, or a reflex angle. The example second and fourth side surfaces 216, 220 define the boundaries for measuring the example angle 232. In the illustrated example, the third side surface 218 forms a portion of the first fastener opening 204 and is curved to match an inner radius that defines the boundaries of the first fastener opening 204. However, in other examples, the third side surface 218 may not form a portion of the first fastener opening 204. For example, the protrusion 212 may be spaced further from the first fastener opening 204, such that a portion of the first contact surface 202 is disposed between the third side surface 218 of the protrusion 212 and the first fastener opening 204. In the illustrated example, the anchor bracket 110 includes another keying feature 250 disclosed in further detail herein.

While in the illustrated example the first keying feature 210 includes one protrusion, in other examples the first keying feature 210 may have multiple protrusions. For example, the first keying feature 210 may be formed by two protrusions having annular sector shapes, substantially similar to the protrusion 212, that extend outwardly from the example first contact surface 202. Further, while in the illustrated example the first keying feature 210 is an annular sector shape, in other examples, the shape of the keying feature can be a shape other than the annular sector shape, such as a rectangle, circle, diamond, star, pentagon, or any other shape.

Figure 3:
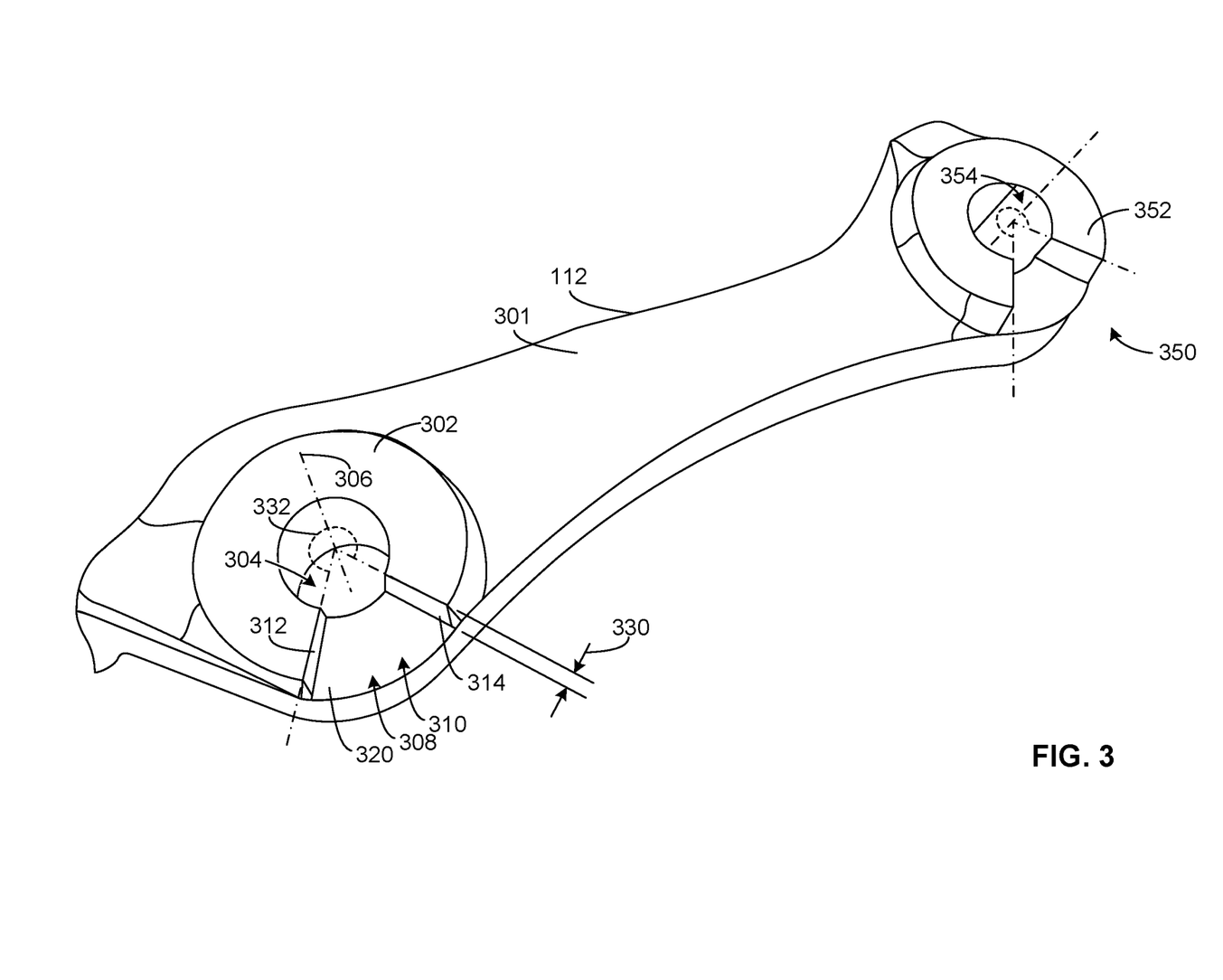
FIG. 3 illustrates an example mount having a second example keying feature.

FIG. 3 illustrates a portion of the example mount 112 of FIG. 1. In the illustrated example, the mount 112 includes a body 301 having a second contact surface 302 and a second fastener opening 304 formed in the second contact surface 302. The second fastener opening 304 may be of substantially the same size (e.g., diameter) as the first fastener opening 204 (FIG. 2). The second fastener opening 304 is to receive a fastener, such as the bolt 114 (FIG. 1), to couple the anchor bracket 110 (FIG. 1) to the mount 112 (FIG. 1). A second axis 306 of the second fastener opening 304 extends parallel to a rotational axis of the rotor 106 (FIG. 1). The first axis 206 (FIG. 2) and the second axis 306 are to be aligned (e.g., coaxial) when the anchor bracket 110 and the mount 112 are coupled. In the illustrated example, the mount 112 includes a second keying feature 308. In this example, the second keying feature 308 is implemented as a cavity 310 extending into the second contact surface 302. The cavity 310 has an annular sector shape, when viewed in planform, that matches (e.g., matchably receives) the annular sector shape of the protrusion 212 (FIG. 2).

The example cavity 310 is formed by one or more side surfaces (e.g., side walls) extending inwardly from the second contact surface 302 and a bottom surface that is substantially parallel to the second contact surface 302. In the example of FIG. 3, the cavity 310 is formed by a fifth side surface 312 and a sixth side surface 314 extending inwardly (e.g., perpendicularly) from the second contact surface 302 and a bottom surface 320 extending between the fifth and sixth side surfaces 312, 314. In the illustrated example, the bottom surface 320 and the second contact surface 302 are substantially parallel and a height 330 of the fifth and sixth sides surfaces 312, 314 is substantially the same. However, in other examples, the height 330 of the fifth and sixth side surfaces 312, 314 may be different and the bottom surface 320 may be angled with respect to the second contact surface 302.

In the illustrated example, the annular sector shape of the cavity 310 is defined by an angle 332. In the illustrated example, the example angle 332 is a reflex angle (e.g., greater than 180 degrees). However, in other examples, the angle 332 can be other angles such as a right angle, an obtuse angle, or an acute angle. The example fifth and sixth side surfaces 312, 314 define the boundaries for measuring the example angle 332. In the illustrated example, the angle 232 of FIG. 2 and the angle 332 of FIG. 3 sum to three hundred and sixty degrees (e.g., a full circle). In the illustrated example the second, fourth, and top surfaces 216, 220, 222 of the first keying feature 210 of FIG. 2 are substantially congruent to the fifth, sixth, and bottom surfaces 312, 314, 320 of the second keying feature 308. For example, the protrusion 212 is substantially congruent to the cavity 310.

While in the illustrated example the second keying feature 308 includes one annular sector cavity, in other examples, the second keying feature 308 may have multiple cavities. For example, the second keying feature 308 may be formed by two cavities having annular sector shapes, substantially similar to the cavity 310, that extend inwardly from the example second contact surface 302. Additionally or alternatively, the shape of the keying feature can be a shape other than the annular sector shape, such as a rectangle, circle, diamond, star, pentagon, or any other shape.

Returning briefly to the illustrated example of FIG. 2, the anchor bracket 110 has a third keying feature 250 formed on a third contact surface 252 near a third fastener opening 254. In the illustrated example, the third keying feature 250 is substantially identical to the first keying feature 210. To avoid redundancy, a description of the third keying feature 250 is not provided. Instead, the interested reader is referred to the description of the first keying feature 210. In other examples, the third keying feature 250 may be different from the example first keying feature 210 and/or the third keying feature 250 may be disposed in another location relative to the third fastener opening 254.

Additionally, the example mount 112 of FIG. 3 has a fourth keying feature 350 formed in a fourth contact surface 352 near a fourth fastener opening 354. In the illustrated example, the fourth keying feature 350 is substantially identical to the second keying feature 308. Thus, to avoid redundancy, a description of the fourth keying feature 350 is not provided. Instead the interested reader is referred to the description of the second keying feature 308. In other examples, the fourth keying feature 350 may be different from the example second keying feature 308 and/or disposed in a different location relative to the fourth fastener opening 354. Similar to the first and second keying features 210, 308, the third and fourth keying features 250, 350 are substantially congruent.

Figure 4:
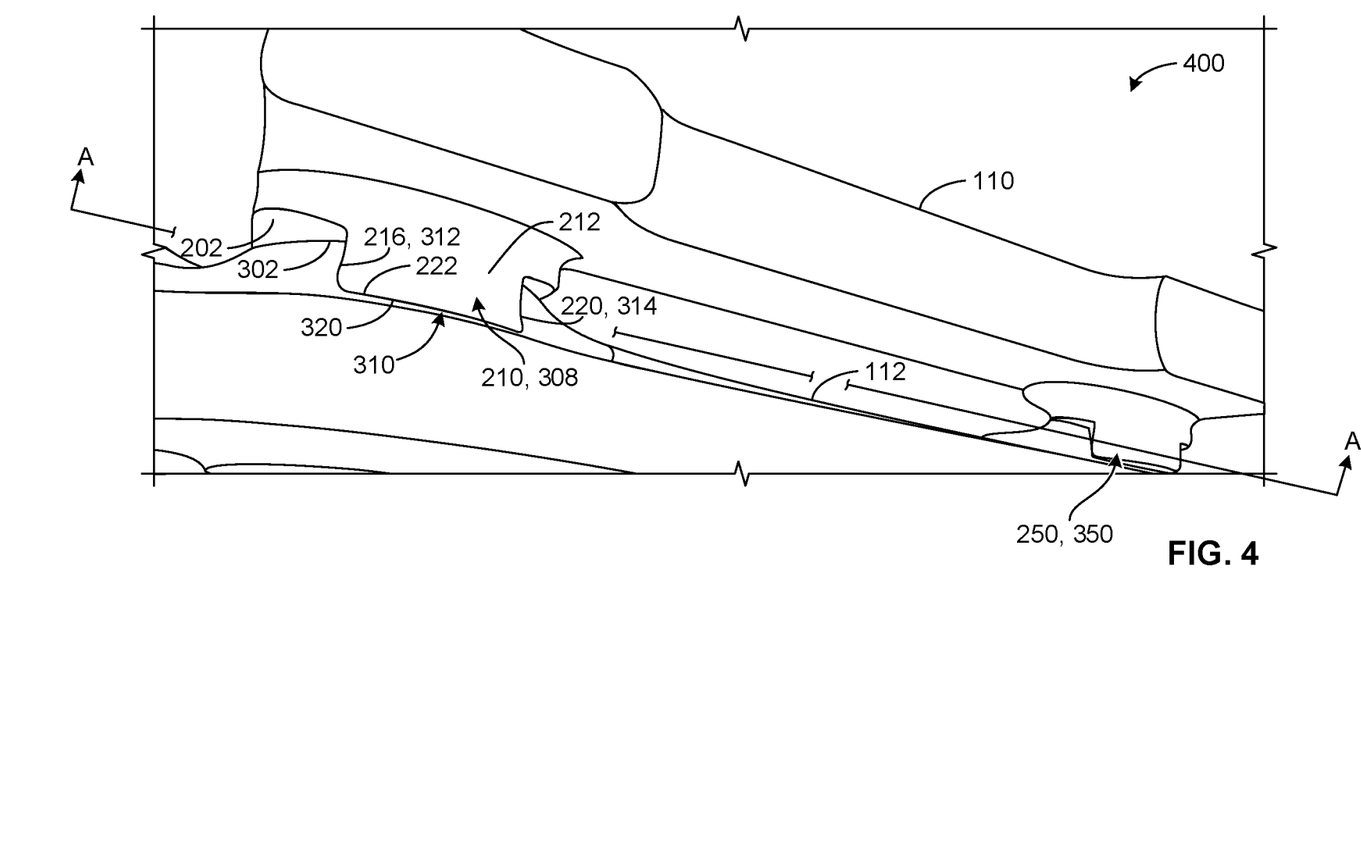
FIG. 4 illustrates an example mechanically-keyed non-slip brake joint formed by coupling the example anchor bracket of FIG. 2 and the example mount of FIG. 3.

FIG. 4 illustrates an example mechanically-keyed non-slip brake joint 400 formed by coupling the example bracket 110 of FIGS. 1 and 2 and the example mount 112 of FIGS. 1 and 3. The example brake joint 400 is formed when the example first keying feature 210 of FIG. 2 is in contact with the example second keying feature 308 of FIG. 3.

As illustrated in FIG. 4, when the protrusion 212 matably engages the cavity 310, the first contact surface 202 of the anchor bracket 110 is in contact with the second contact surface 302 of the mount 112, and the top surface 222 of the protrusion 212 is in contact with the bottom surface 320 of the cavity 310. In other examples, if the example height 230 (FIG. 2) is different from the example height 330 (FIG. 3), either the first contact surface 202 is in contact with the second contact surface 302, or the top surface 222 is in contact with the bottom surface 320.

Additionally, when the protrusion 212 is disposed in the cavity 310, the second side surface 216 of the protrusion 212 is in contact with the fifth side surface 312 of the cavity 310 and the fourth side surface 220 of the protrusion 212 is in contact with the sixth side surface 314 of the cavity 310. During an application of the brake 102 (FIG. 1), a force applied by the brake 102 acts perpendicularly to the first axis 206 (FIG. 2) and the second axis 306 (FIG. 3) and acts as a shear force through the brake joint 400. When shear forces are exerted on the example brake joint 400, the shear force is transferred between the second side surface 216 of the protrusion 212 and the fifth side surface 312 of the cavity 310, and/or between the fourth side surface 220 of the protrusion 212 and the sixth side surface 314 of the cavity 310.

Figure 5:
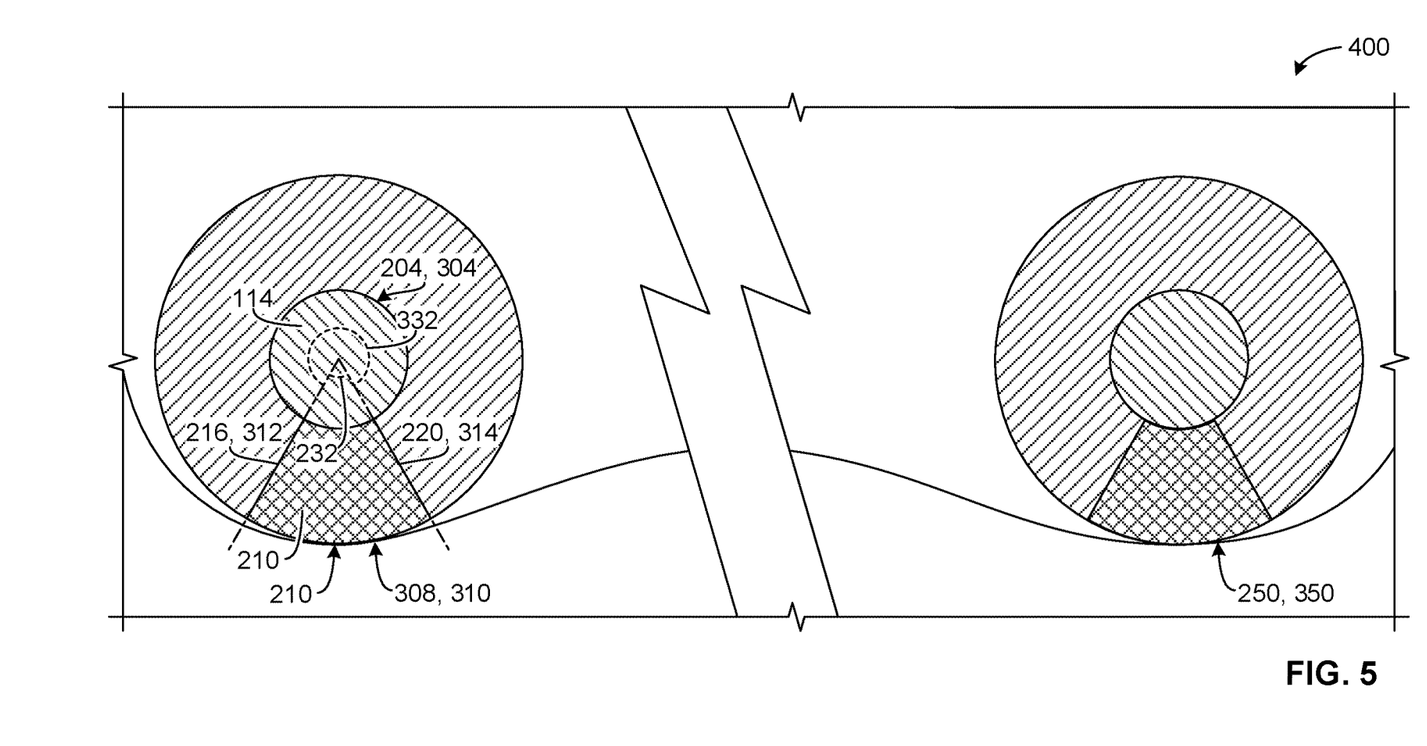
FIG. 5 is a cross-sectional view of the example brake joint of FIG. 4 taken along line A-A of FIG. 4.

FIG. 5 is a cross sectional view of the brake joint 400 of FIG. 4 taken along line A-A of FIG. 4. In the illustrated example of FIG. 5, one of the bolts 114 is disposed in the first fastener opening 204 and the second fastener opening 304. In some examples, the bolt 114 is in contact with the first keying feature 210 and the second keying feature 308. However, in other examples, the bolt 114 may be in contact with only one keying feature or neither keying feature.

The example second side surface 216 of the protrusion 212 is in contact with the fifth side surface 312 of the cavity 310, and the fourth side surface 220 of the protrusion 212 is in contact with the sixth side surface 314 of the cavity 310. The example first angle 232 and the example second angle 332, as shown in FIG. 5, together sum to three hundred and sixty degrees (e.g., a full circle). In such an example, the protrusion 212 is fit (e.g., with negligible clearance that can still be assembled by hand, such as with a tight fit) in the cavity 310, and as a result, the anchor bracket 110 (FIG. 1) remains stationary relative to the mount 112 (FIG. 1). Any gap or clearance between the second and fourth side surfaces 216, 220 and the first and sixth side surfaces 312, 314 is less than a gap or clearance between the first and second fastener openings 204, 304 and the bolt 114. As such, during a brake application when the anchor bracket 110 is pulled in the direction of rotation of the rotor (to the left or right in FIG. 5), the force is transferred from the protrusion 212 of the anchor bracket 110 into the cavity 310 of the mount 112, and not through the bolt 114. Therefore, the first and second keying features reduce or eliminate movement between the anchor bracket 110 and the mount 112 and, thus, reduce or eliminate slippage. Further, by reducing or eliminating this movement, the first and second keying features 210, 308 reduce or eliminate torque fall-off and clamp force fall-off commonly seen in known slip joints.

In some examples, the first and second keying features 210, 308 may be implemented to align the first and second fastener openings 204, 304. For example, the protrusion 212 may be dimensioned such that when the protrusion 212 is inserted into cavity 310 and moved toward the second fastener opening 304, the second and fourth side surfaces 216, 220 of the protrusion 212 engage the fifth and sixth side surfaces 312, 314 when the first and second fastener openings 204, 304 are aligned (e.g., the first axis 206 and the second axis 306 are coaxial). As such, the first and second keying features 210, 308 facilitate alignment of the first and second fastener openings 204, 304 to prevent cross-threading when the bolt 114 is inserted into the first and second fastener openings 204, 304.

In the illustrated example of FIGS. 4 and 5, the example brake joint 400 is also formed by the third keying feature 250 and the fourth keying feature 350. In other examples, only the first keying feature 210 and the second keying feature 308 may be implemented to form the brake joint 400. In other examples, the example brake joint 400 may include additional keying feature pairs.

Figure 6:
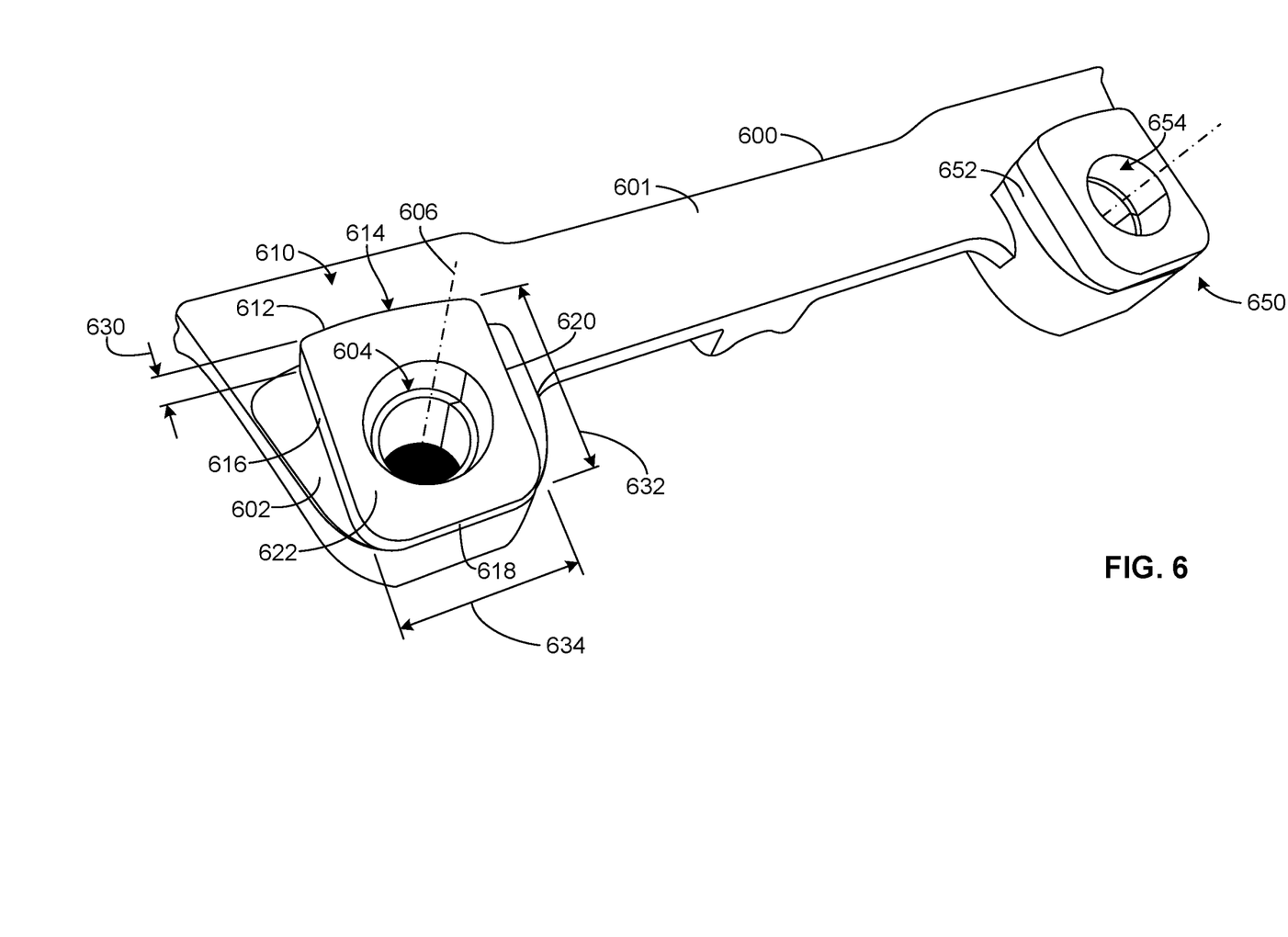
FIG. 6 illustrates another example anchor bracket having a first example keying feature.

FIG. 6 illustrates a section of another example anchor bracket 600 that may be used to form a mechanically-keyed non-slip brake joint. Similar to the anchor bracket 110 of FIG. 2, the anchor bracket 600 includes a body 601 having a first contact surface 602 and a first fastener opening 604 formed in the first contact surface 602. The first fastener opening 604 is to receive a fastener, such as a bolt, a pin, etc., to couple the anchor bracket 600 to a mounting structure (e.g., the mount 700 of FIG. 7). A first axis 606 of the first fastener opening 604 extends parallel to a rotational axis of the rotor 106 (FIG. 1). In the illustrated example, the anchor bracket 600 includes a first keying feature 610. In this example, the first keying feature 610 is implemented as a protrusion 612 extending from the first contact surface 602. The protrusion 612 has a generally rectangular shape (with rounded corners) when viewed in planform.

The example protrusion 612 is formed by one or more side surfaces extending outwardly from the first contact surface 602 and a top surface that is substantially parallel to the first contact surface 602. In the example of FIG. 6, the protrusion 612 is formed by a first side surface 614, a second side surface 616, a third side surface 618, and a fourth side surface 620 extending outwardly (e.g., perpendicularly) from the first contact surface 602 and a top surface 622 extending between the first, second, third, and fourth side surfaces 614, 616, 618, 620. In the illustrated example, the top surface 622 and the first contact surface 602 are substantially parallel and a height 630 of each of the first, second, third, fourth sides surfaces 614, 616, 618, 620 is substantially the same. However, in other examples, the heights 630 of the first, second, third, and/or fourth side surfaces 614, 616, 618, 620 may be different and the top surface 622 may be angled with respect to the first contact surface 602. In the illustrated example, the rectangular shape is defined by a first length 632 and a first width 634. The example first length 632 is longer than the example first width 634. However, in other examples, the first width 634 may be longer than the first length 632 or the first length 632 and the first width 634 may be substantially the same.

In the illustrated example, the first fastener opening 604 is disposed on the example top surface 622, and the first fastener opening 604 is entirely circumscribed by the protrusion 612, and is disposed through a center of the protrusion 612. In other examples, the first fastener opening 604 may only partially be circumscribed by the protrusion 612. In the illustrated example, the anchor bracket 600 includes another keying feature 650 disclosed in further detail herein.

Figure 7:
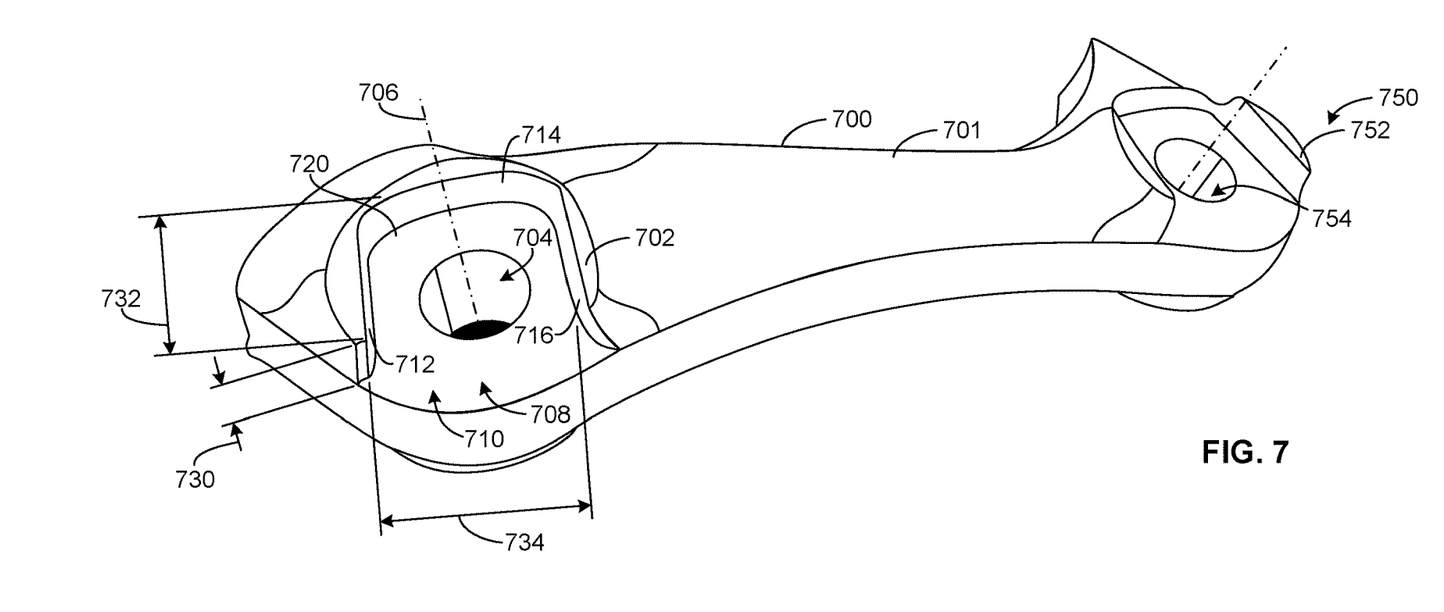
FIG. 7 illustrates another example mount having a second example keying feature.

FIG. 7 illustrates another example mounting structure 700, referred to herein as the mount 700. Similar to the mount 112 of FIG. 3, the mount 700 includes a body 701 having a second contact surface 702 and a second fastener opening 704 formed in the second contact surface 702. The second fastener opening 704 is of substantially the same size as the first fastener opening 604. The second fastener opening 704 is to receive a fastener, such as a bolt, a pin, etc., to couple the anchor bracket 600 (FIG. 6) to the mount 700. A second axis 706 of the second fastener opening 704 extends parallel to a rotational axis of the rotor 106 (FIG. 1). In the illustrated example, the mount 700 includes a second keying feature 708. In this example, the second keying feature 708 is implemented as a cavity 710 extending into the second contact surface 702. The cavity 710 has a complementary rectangular shape when viewed in planform that matches the rectangular shape of the protrusion 612 (FIG. 6).

The example cavity 710 is formed by one or more side surfaces extending inwardly from the second contact surface 702 and a bottom surface that is substantially parallel to the second contact surface 702. In the example of FIG. 7, the cavity 710 is formed by a fifth side surface 712, a sixth side surface 714, and a seventh side surface 716 extending inwardly (e.g., perpendicularly) from the second contact surface 702 and a bottom surface 720 along an edge of the fifth, sixth, and seventh side surfaces 712, 714, 716 opposite the second contact surface 702. In the illustrated example, the bottom surface 720 and the second contact surface 702 are substantially parallel and a height 730 of the fifth side surface 712 is substantially uniform. However, in other examples, the height 730 of the fifth side surface 712 may be non-uniform and the bottom surface 720 may be angled with respect to the second contact surface 702.

In the illustrated example, the rectangular shape of the cavity 710 is defined by a second length 732 and a second width 734. The example second length 732 is longer than the example second width 734. However, in other examples, the example second width 734 is longer than the example second length 732. In the illustrated example, the first length 632 is substantially equal to the second length 732 and the first width 634 is substantially equal to the second width 734. In the illustrated example, the first and top surfaces 614 and 622 of the first keying feature 610 of FIG. 6 are substantially congruent to the third and bottom surfaces 712 and 720 of the second keying feature 708. For example, the protrusion 612 is substantially congruent to the cavity 710.

Returning briefly to the illustrated example of FIG. 6, the anchor bracket 600 has the third keying feature 650 formed on a third contact surface 652 near a third fastener opening 654. In the illustrated example, the third keying feature 650 is substantially identical to the first keying feature 610. To avoid redundancy, a description of the third keying feature 650 is not provided. Instead, the interested reader is referred to the description of the first keying feature 610. In other examples, the third keying feature 650 may be different from the example first keying feature 610 and/or the third keying feature 650 may be disposed in another location relative to the third fastener opening 654.

Additionally, the example mount 700 of FIG. 7 has a fourth keying feature 750 found in a fourth contact surface 752 near a fourth fastener opening 754. In the illustrated example, the fourth keying feature 750 is substantially identical to the second keying feature 708. Thus to avoid redundancy, a description of the fourth keying feature 750 is not provided. Instead, the interested reader is referred to the description of the second keying feature 708. In other examples, the fourth keying feature 750 may be different from the example second keying feature 708 and/or the fourth keying feature 750 is disposed in a different location relative to the fourth fastener opening 754. Similar to the first and second keying features 610, 708, the third and fourth keying features 650, 750 are substantially congruent.

Figure 8:
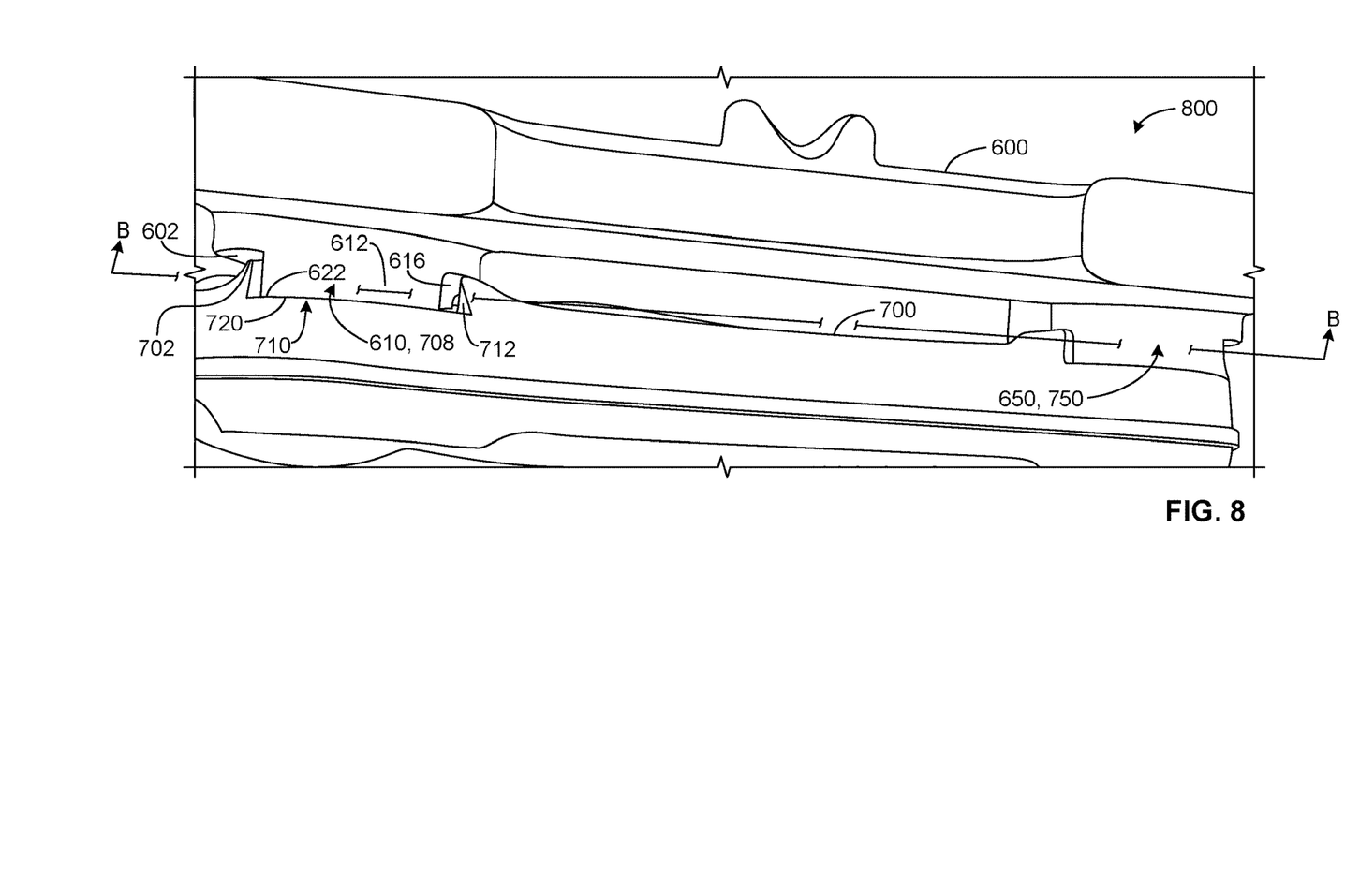
FIG. 8 illustrates an example mechanically-keyed non-slip brake joint formed by coupling the example anchor bracket of FIG. 6 and the example mount of FIG. 7.

FIG. 8 illustrates an example mechanically-keyed non-slip brake joint 800 formed by coupling the example anchor bracket 600 of FIG. 6 and the example mount 700 of FIG. 7. The example brake joint 800 is formed when the example first keying feature 610 of FIG. 6 is in contact with the example second keying feature 708 of FIG. 7.

In the illustrated example of FIG. 8, when the protrusion 612 matably engages cavity 710, the first contact surface 602 of the anchor bracket 600 is in contact with the second contact surface 702 of the mount 700, and the top surface 622 of the protrusion 612 is in contact with the bottom surface 720 of the cavity 710. In other examples, if the example height 630 (FIG. 6) is different from the example height 730 (FIG. 7), either the first contact surface 602 is in contact with the second contact surface 702, or the top surface 622 is in contact with the bottom surface 720.

Additionally, when the protrusion 612 is disposed in the cavity 710, the second side surface 616 of the protrusion 612 is in contact with the fifth side surface 712 of the cavity 710, the third side surface 618 of the protrusion 612 is in contact with the sixth side surface 714 of the cavity 710, and the fourth side surface 620 of the protrusion 612 is in contact with the seventh side surface 716 of the cavity 710. During an application of the brake, a force applied by the brakes acts perpendicularly to the first axis 606 (FIG. 6) and the second axis 706 (FIG. 7) and acts as a shear force through the brake joint 800. When shear forces are exerted on the example brake joint 800, the shear force is transferred between the second side surface 616 of the protrusion 608 and the fifth side surface 712 of the cavity 710.

Figure 9:
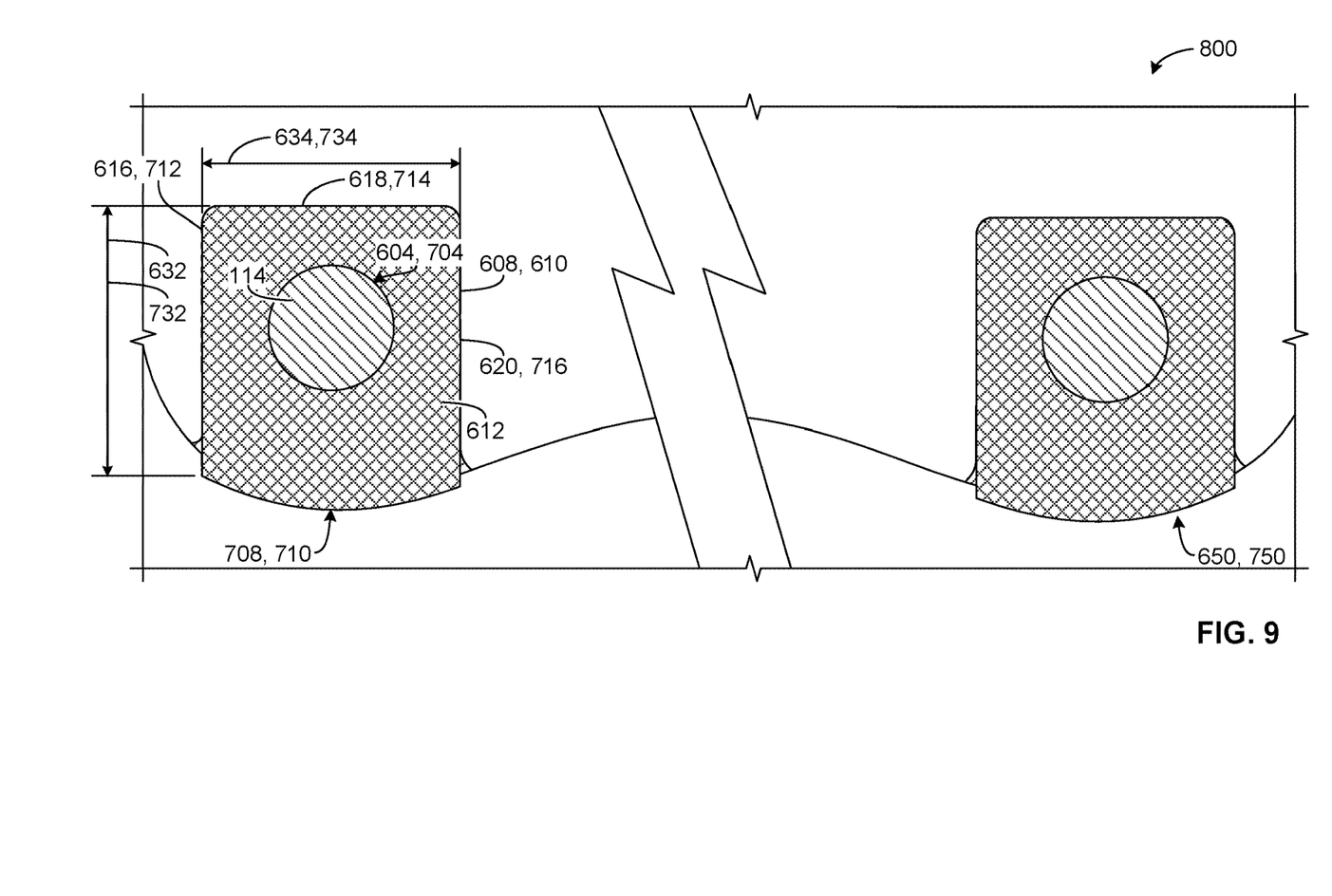
FIG. 9 is a cross-sectional view of the example brake joint of FIG. 8 taken along the line B-B of FIG. 8.

FIG. 9 is a cross sectional view of the brake joint 800 of FIG. 8 taken along the line B-B of FIG. 8. In the illustrated example of FIG. 9, one of the bolts 114 is disposed in the first fastener opening 604 and the second fastener opening 704. In some examples, the bolt 114 is in contact with the first keying feature 610 and the second keying feature 708. However, in other examples, the fastener may be in contact with only one keying feature or neither keying feature.

The example second side surface 616 of the protrusion 612 is in contact with the fifth side surface 712 of the cavity 710, the example third side surface 618 of the protrusion 612 is in contact with the sixth side surface 714 of the cavity 710, and the fourth side surface 620 of the protrusion 612 is in contact with the seventh side surface 716 of the cavity 710. In the illustrated example, the first length 632 and the second length 732 are substantially the same, and the first width 634 and the second width 734 are substantially the same. For example, the protrusion and the cavity are dimensioned to form a transition fit, such as a tight fit, when the anchor bracket and the mounting structure are coupled. In other examples, the protrusions and the cavity may be dimensioned to form other fits, such as a clearance fit or an interference fit. In such an example, the protrusion 608 is fitted tightly in the cavity 710, and as a result, the anchor bracket 600 does not move relative to the mount 700. When the brake is applied, shear force is transferred through the side surfaces of the protrusion 612 and the cavity 710, rather than through the bolt 114 as seen in known slip joints. As such, the example brake joint 800 substantially reduces or eliminates slippage, as well as torque fall-off and clamp force fall-off and cleanup force fall-off seen in known slip joints.

In the illustrated example of FIGS. 8 and 9, the example brake joint 800 is also formed by the coupling of the third keying feature 650 and the fourth keying feature 750. The example third and fourth keying features 650, 750 are substantially identical to the first and second keying features 610, 708. Therefore, the interaction between these components is substantially the same. Thus, to avoid redundancy, a description of the third and fourth keying features 250, 350 is not repeated herein. In other examples only the first keying feature 610 and the second keying feature 708 may be implemented to form the brake joint 800. In other examples, the brake joint 800 may include additional keying feature pairs.

Figure 10:
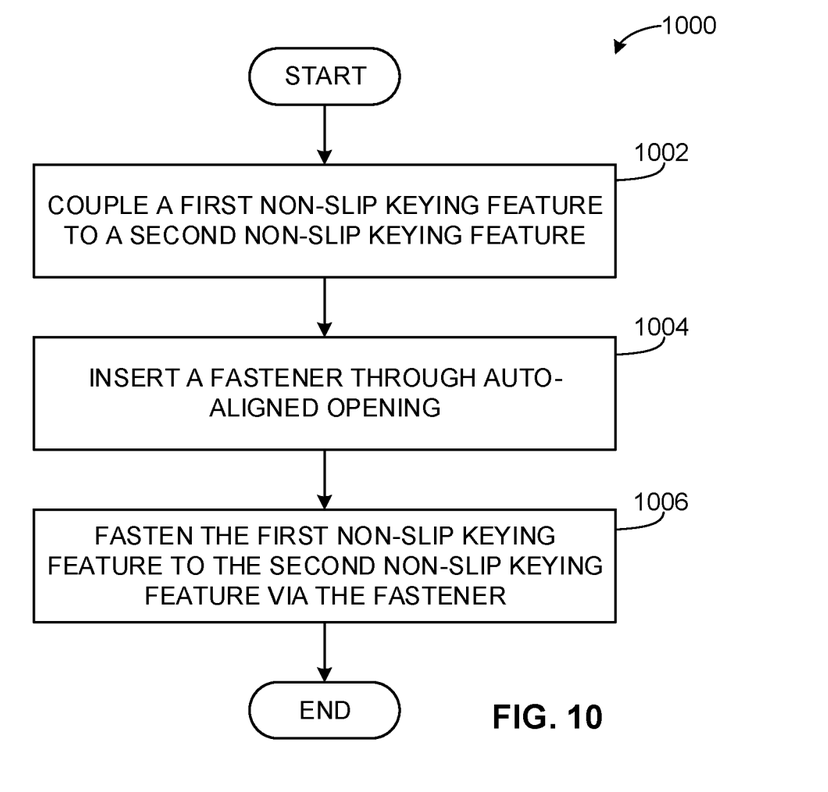
FIG. 10 is a flowchart representative of an example method to assemble an example mechanically-keyed non-slip brake joint.

FIG. 10 is a flowchart representative of an example method 1000 to assemble a mechanically-keyed non-slip brake joint, such as the example brake joint 400 of FIG. 4 or the brake joint 800 of FIG. 8. While the method 1000 can be implemented with either the brake joint 400 of FIG. 4 or the brake joint 800 of FIG. 8, the example method 1000 is described in connection with the brake joint 400 of FIG. 4.

At block 1002, the first keying feature 210 of the anchor bracket 110 is coupled to (e.g., matably engaged with) the second keying feature 308 of the mount 112. For example, the first keying feature 210 may be inserted into the second keying feature 308. In some examples, the anchor bracket 110 moved (e.g., slid) in a direction parallel to the mount 112 until the protrusion 208 is fit in the cavity 310 (e.g., and form a transition fit, such as a tight fit, a clearance fit, or an interference fit). In some examples, the first fastener opening 204 and the second fastener opening 304 are automatically aligned when the first and second keying features 210, 308 are coupled.

At block 1004, the example bolt 114 of FIG. 5 is inserted into the first fastener opening 204 and the second fastener opening 304 (e.g., when the first and second keying features 210, 308 are coupled the first axis 206 and the second axis 306 are automatically aligned).

At block 1006, the bolt 114 is secured in the first fastener opening 204 and the second fastener opening 304. In some examples, the first fastener opening 204 and the second fastener opening 304 are threaded to receive the bolt 114. In other examples, a nut may be fastened (e.g., threaded) onto an end of the bolt 114. In other examples, another type of fastener may be used. Further, the example third and fourth keying features 250 and 350 may be similarly coupled and fastened with the other bolt 114.

From the foregoing, it will be appreciated that example methods, apparatus and articles of manufacture have been disclosed that reduce the slippage of an anchor bracket with respect to a mounting structure in association with a vehicle brake apparatus. A first keying feature on an anchor bracket in physical contact with a second keying feature on a mounting structure form a mechanically-keyed joint that prevents slippage of the anchor bracket with respect to the mounting structure. Preventing slippage prevents fastener movement, torque fall-off, and clamp force fall-off, and improve brake reliability.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    an anchor bracket to mount a brake caliper near a rotor, the anchor bracket having a first contact surface with a first fastener opening therethrough, an axis of the first fastener opening extending parallel to a rotational axis of the rotor, a protrusion extending from the first contact surface; and
    a mount having a second contact surface with a second fastener opening therethrough, a cavity formed in the second contact surface, the anchor bracket to be coupled to the mount such that the protrusion matably engages the cavity.

2. The apparatus of claim 1, wherein the protrusion is rectangularly shaped and the cavity has a complementary rectangular shape to receive the protrusion.

3. The apparatus of claim 2, wherein the protrusion is formed around the first fastener opening, and the cavity is formed around the second fastener opening.

4. The apparatus of claim 1, wherein the protrusion has an annular sector shape and the cavity has a complementary annular sector shape to receive the protrusion.

5. The apparatus of claim 1, wherein the first fastener opening and the second fastener opening are aligned when the protrusion matably engages the cavity.

6. The apparatus of claim 1, wherein at least a portion of the protrusion contacts a side surface of the cavity when the anchor bracket and the mount are coupled.

7. The apparatus of claim 1, wherein the mount is a steering knuckle of a vehicle.

8. A brake anchor bracket to mount a caliper near a rotor, the brake anchor bracket comprising:
    a body having a contact surface to be coupled to a mount on a vehicle, an opening formed in the contact surface to receive a fastener, an axis of the opening extending parallel to a rotational axis of the rotor; and
    a protrusion extending from the contact surface at or near the opening, the protrusion formed by at least one side surface extending from the contact surface and a top surface substantially parallel to the contact surface.

9. The brake anchor bracket of claim 8, wherein the protrusion surrounds the opening.

10. The brake anchor bracket of claim 9, wherein the protrusion is a raised rectangular protrusion, and wherein the opening extends through the raised rectangular protrusion.

11. The brake anchor bracket of claim 9, wherein the protrusion is a raised annular sector protrusion.

12. The brake anchor bracket of claim 11, wherein an angle of the raised annular sector protrusion is acute.

13. A brake joint comprising:
    an anchor bracket to mount a brake caliper near a rotor, the anchor bracket having a first contact surface with a first fastener opening therethrough, an axis of the first fastener opening extending parallel to a rotational axis of the rotor, the anchor bracket having a first keying feature; and
    a mount having a second contact surface with a second fastener opening therethrough, the mount having a second keying feature, the second keying feature to matably engage with the first keying feature when the mount and the anchor bracket are coupled.

14. The brake joint of claim 13, wherein one of the first keying feature or the second keying feature is a rectangular protrusion and the other of the first keying feature or the second keying feature is a rectangular cavity.

15. The brake joint of claim 13, wherein one of the first keying feature or the second keying feature is an annular sector protrusion and the other of the first keying feature or the second keying feature is an annular sector cavity.

16. The brake joint of claim 15, wherein an inner radius of the annular sector protrusion forms at least a portion of the first opening or the second opening.

17. The brake joint of claim 15, wherein an angle of the annular sector protrusion is acute.

18. The brake joint of claim 13, wherein at least a portion of the first keying feature contacts a side surface of the second keying feature when the anchor bracket and the mount are coupled.

19. The brake joint of claim 13, wherein the first fastener opening and the second fastener opening are aligned when the first keying feature and the second keying feature are matably engaged.

20. The brake joint of claim 13, wherein the mount is a steering knuckle of a vehicle.

* * * * *